Feb. 11, 1930.  H. A. SELAH  1,746,909
CONDUIT BOX COVER
Filed Aug. 8, 1925

Inventor
Howard A. Selah
By
Attorney

Patented Feb. 11, 1930

1,746,909

UNITED STATES PATENT OFFICE

HOWARD A. SELAH, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT-BOX COVER

Application filed August 8, 1925. Serial No. 49,042.

This invention is designed to improve conduit box covers of the transparent or fragile type. It is often desirable to secure metal nipples to the openings from such covers and the present invention is directed to an improved means of securing such nipple to the cover. Features and details of the invention will appear from the specification and claims.

The invention is illustrated in the accompanying drawings as follows:—

Figure 1:
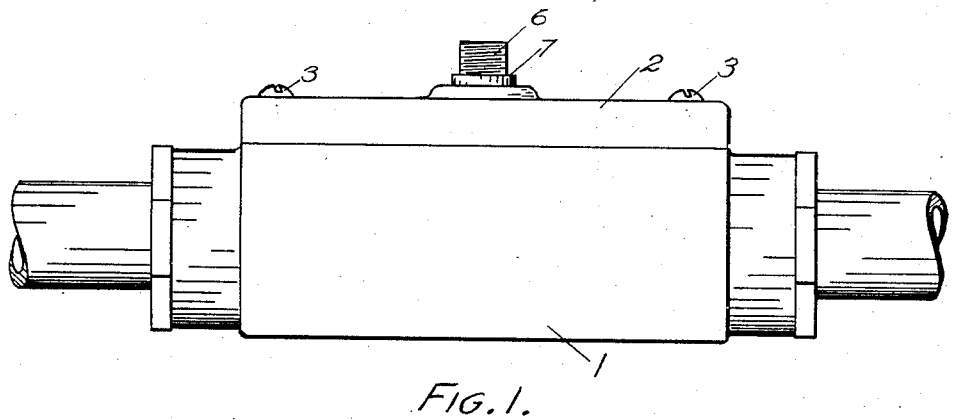

Fig. 1 shows a side elevation of a conduit box.

Figure 2:
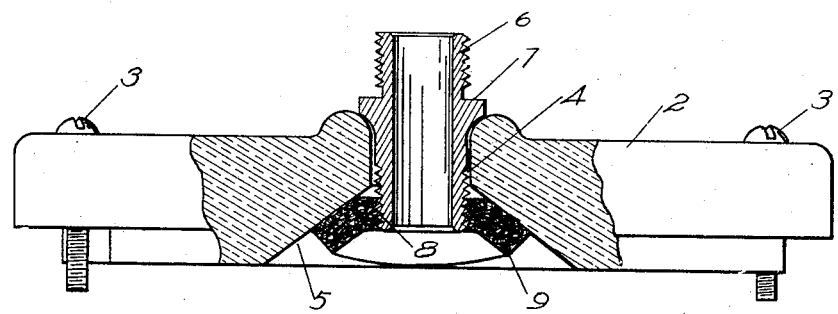

Fig. 2 a side elevation of the cover enlarged slightly in section.

Figure 3:
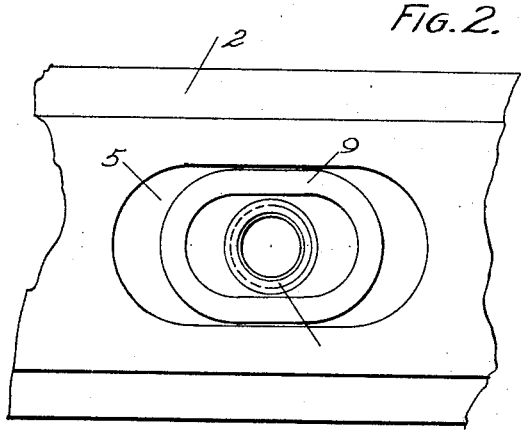

Fig. 3 a plan view of the bottom of the cover.

Figure 4:
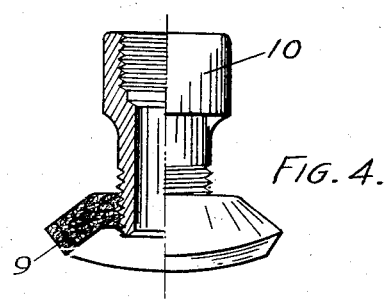

Fig. 4 a side elevation, partly in section, of an alternative construction.

1 marks a conduit box, and 2 a conduit cover of transparent material which is ordinarily secured to the box by screws 3.

The cover has a common outlet opening 4, the underside of which is flared forming an elongated pocket 5 into which the wires may be more readily drawn from the box.

A nipple 6 is provided with a shoulder 7 and the inner end of the nipple in my construction is screw-threaded at 8 and screwed into a yielding nut 9 preferably of fiber board. Preferably the nut while made of uniform thickness is flanged partially to the shape of the socket so that it is drawn farther by the screw. The effect of this is to give a spring pull on the nipple and also to slightly crimp the nut and increase its engagement with the nipple so that the nipple is more firmly held against unscrewing from the nut.

This yielding nut not only maintains the nipple rigidly in the cover but yields sufficiently to take care of the difference in contraction and expansion between the fragile cover and the nipple. This yielding is somewhat increased by the fact that there is not a direct engagement between the face of the nut at the screw with the walls of the cover. Thus there is not only the slight yielding of the nut due to its compressibility but also some yielding by reason of its flexibility.

The elongated socket locks the nut against turning so that the nipple may be readily put in place.

The nipple may be male or female and in Figs. 1 and 2 a male nipple is shown and in Fig. 4 a female nipple 10 is substituted.

What I claim as new is:—

1. In combination with a conduit box cover of fragile material having an opening flaring at its inner end; a nipple in the opening having a screw-thread at its inner end; and a nut of yielding material on the nipple engaging the flaring surfaces of the opening said nut being initially flatter than the flaring surface.

2. In combination with a conduit box cover of fragile material having an opening flaring at its inner end; a nipple in the opening having a screw-thread at its inner end; and a cup-shaped nut of yielding material of uniform thickness on the nipple engaging the flaring surfaces of the opening said nut being initially flatter than the flaring surface.

In testimony whereof I have hereunto set my hand.

HOWARD A. SELAH.